(12) United States Patent
Geenen et al.

(10) Patent No.: US 8,771,045 B2
(45) Date of Patent: Jul. 8, 2014

(54) SEAL, CONSTITUENT PARTS OF THE SEAL, DEVICE AND METHOD FOR ARRANGING SUCH A SEAL

(75) Inventors: Kamiel Reinier Zale Geenen, Ravenstein (NL); Bernard Jan Kamp, Oldenzaal (NL); Simon Alexander Verheul, Beek Ubbergen (NL); Erwin Herman Gerhardus Heurman, Enschede (NL)

(73) Assignee: Kuziba B.V., Enschede (NL)

( * ) Notice: Subject to any disclaimer, the term of this patent is extended or adjusted under 35 U.S.C. 154(b) by 161 days.

(21) Appl. No.: 13/509,057

(22) PCT Filed: Nov. 10, 2010

(86) PCT No.: PCT/NL2010/050744
§ 371 (c)(1),
(2), (4) Date: Jul. 10, 2012

(87) PCT Pub. No.: WO2011/059318
PCT Pub. Date: May 19, 2011

(65) Prior Publication Data
US 2013/0102235 A1     Apr. 25, 2013

(30) Foreign Application Priority Data
Nov. 11, 2009   (NL) .................................... 2003787

(51) Int. Cl.
*A22B 7/00*   (2006.01)
(52) U.S. Cl.
USPC .......................................................... 452/52
(58) Field of Classification Search
USPC ................................. 452/176, 52
See application file for complete search history.

(56) References Cited

U.S. PATENT DOCUMENTS

| 3,407,160 A | 10/1968 | Frank |
| 3,864,294 A | 2/1975 | Busch, Jr. |

(Continued)

FOREIGN PATENT DOCUMENTS

| DE | 2345560 | 5/1974 |
| DE | 102009037932 A1 | 2/2011 |

(Continued)

OTHER PUBLICATIONS

Römpp Lexikon Lacke und Druckfarben [Römpp Lexikon paints and printing inks], Georg Thieme Verlag 1998, keywords Farbmittel, Farbstoffe, Pigmente [Colorants, Dyes, Pigments].

(Continued)

*Primary Examiner* — Richard Price, Jr.
(74) *Attorney, Agent, or Firm* — The Webb Law Firm, P.C.

(57) ABSTRACT

Provided is a seal for sealing the esophagus of a slaughtered animal such as a cow, the constituent parts of such a seal and a device and a method for sealing the esophagus of a slaughtered animal, such as a cow, by arranging such a seal. The seal comprises a cylindrical body which can be placed in the esophagus and is provided with a cylindrical peripheral wall with an end wall, a clamping element which can be displaced to a clamping position relative to the body for clamping oesophageal tissue between at least a part of the clamping element and the cylindrical body, thus fixing the seal in the esophagus and thereby sealing the esophagus, wherein the peripheral wall encloses a receiving space and is provided with an opening through which oesophageal tissue can be carried into the receiving space and is there clamped fixedly by the clamping element.

24 Claims, 10 Drawing Sheets

(56) References Cited

U.S. PATENT DOCUMENTS

| | | | |
|---|---|---|---|
| 4,112,979 A * | 9/1978 | Widdicombe | 138/89 |
| 4,114,654 A * | 9/1978 | Richardson | 138/89 |
| 4,375,011 A * | 2/1983 | Grunau | 174/653 |
| 4,407,310 A | 10/1983 | Jadow | |
| 4,822,423 A | 4/1989 | Soyama et al. | |
| 5,330,750 A | 7/1994 | Sheard et al. | |
| 5,499,737 A * | 3/1996 | Kraus | 220/787 |
| 5,612,021 A | 3/1997 | Mellul | |
| 5,688,164 A * | 11/1997 | Mills et al. | 452/122 |
| 5,830,053 A * | 11/1998 | Vick et al. | 452/176 |
| 5,964,936 A | 10/1999 | Reisser | |
| 6,190,249 B1 * | 2/2001 | Karubian | 452/176 |
| 6,367,484 B1 | 4/2002 | Ramin et al. | |
| 6,645,286 B2 | 11/2003 | Ostertag et al. | |
| 7,651,562 B2 | 1/2010 | Kaupp et al. | |
| 7,828,890 B2 | 11/2010 | Henglein et al. | |
| 2007/0190000 A1 | 8/2007 | Arnaud et al. | |
| 2009/0126316 A1 | 5/2009 | Ilekti et al. | |
| 2011/0052804 A1 | 3/2011 | Banks | |
| 2011/0226161 A1 | 9/2011 | Schumacher et al. | |
| 2011/0259243 A1 | 10/2011 | Schumacher et al. | |
| 2011/0265689 A1 | 11/2011 | Schumacher et al. | |
| 2011/0265690 A1 | 11/2011 | Schumacher et al. | |

FOREIGN PATENT DOCUMENTS

| | | |
|---|---|---|
| DE | 102009037933 A1 | 2/2011 |
| DE | 102009037934 A1 | 2/2011 |
| DE | 102009037935 A1 | 2/2011 |
| EP | 0289240 A1 | 11/1988 |
| EP | 0479669 A1 | 4/1992 |
| EP | 0848735 B1 | 6/1998 |
| EP | 1251152 B1 | 10/2002 |
| EP | 1532213 B1 | 5/2005 |
| EP | 1685198 B1 | 8/2006 |
| EP | 1758550 A2 | 3/2007 |
| EP | 1980594 B1 | 10/2008 |
| EP | 2217664 A1 | 8/2010 |
| JP | 63275512 A | 11/1988 |
| JP | 11302563 A | 11/1999 |
| WO | 9635332 A1 | 11/1996 |
| WO | 0027347 A1 | 5/2000 |
| WO | 0188044 A1 | 11/2001 |
| WO | 2004056716 A1 | 7/2004 |
| WO | 2005063637 A1 | 7/2005 |
| WO | 2007039832 A2 | 4/2007 |
| WO | 2007115675 A2 | 10/2007 |
| WO | 2009097517 A1 | 8/2009 |
| WO | 2009129909 A1 | 10/2009 |

OTHER PUBLICATIONS

S. Schellenberger, M.Entenmann, A. Hennemann, P. Thometzek, Farbe und Lack, Apr. 2007, p. 130.
Waxes for Personal Care Applications, Nov. 1, 2007, XP002617147.
Positiviliste der Kosmetikverordnung (Verordnung (EG) Nr. 1223/2009, Anhang IV respectively Code of Federal Regulations Title 21, Part 73.
Regulation No. 1223 of 2009, Official Journal of Dec. 22, 2009, L342, p. 59, Annex IV.
Byk-Gardner, catalog "Qualitätskontrolle für Lacke und Kunststoffe [Quality control for coatings and plastics]" 2011/2012, pp. 16.
Byk-Gardner, catalog "Qualitätskontrolle für Lacke und Kunststoffe [Quality control for coatings and plastics]" 2011/2012, pp. 97/98.

* cited by examiner

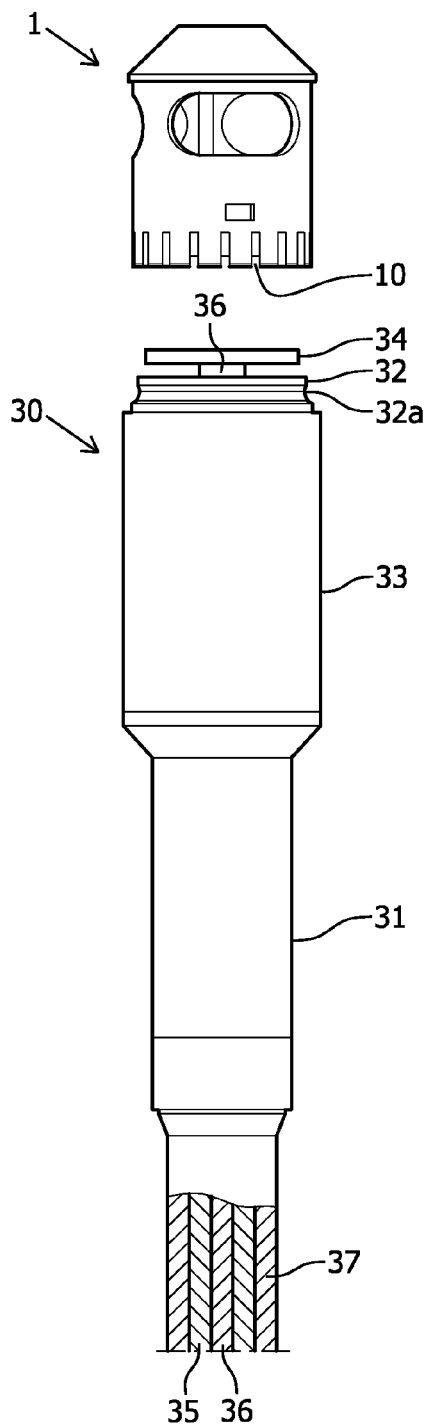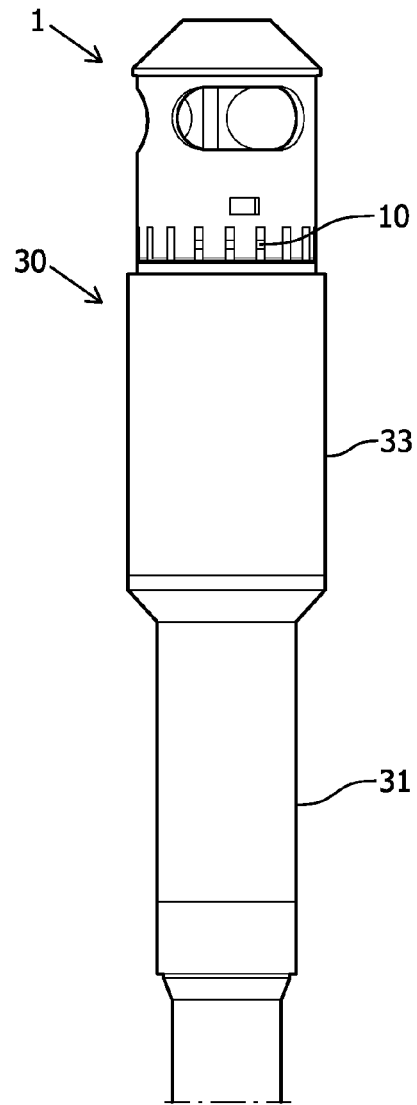
FIG. 12a
FIG. 12b

SEAL, CONSTITUENT PARTS OF THE SEAL, DEVICE AND METHOD FOR ARRANGING SUCH A SEAL

BACKGROUND OF THE INVENTION

1) Field of the Invention

The present invention relates to a seal for sealing the oesophagus of a slaughtered animal, such as a cow, and the constituent parts of such a seal. The invention also relates to a device and a method for sealing the oesophagus of a slaughtered animal, such as a cow, by arranging such a seal.

2) Discussion of the Prior Art

During the slaughter of an animal for slaughtering, such as a cow, the meat of the animal intended for human consumption can be contaminated by substance present in the digestive tract, such as food or at least partly digested food. The slaughtered animal, such as a cow or a pig, can for instance carry the bacterium 'Escherichia coli' or salmonella, which can be transmitted to humans via the meat intended for human consumption. This contamination of meat intended for human consumption is also referred to as fouling. Particularly if a cow is hung head down during slaughtering, the substance can easily leave the digestive tract, for instance through the oesophagus of the animal. Bacteria harmful to humans, such as 'Escherichia coli', can also contaminate meat intended for human consumption when a skin incision is made in order to gain access to the oesophagus. The contamination can penetrate relatively deeply into the pores of the meat, whereby cleaning thereof is difficult or even impossible. There is hereby a risk of at least a part of the meat intended for human consumption being rejected. A frequently used method for solving said problem is to seal the oesophagus, whereby the substance remains inside the digestive tract until the digestive tract is removed.

A known seal is disclosed in WO-A-96/35332. This known seal comprises a substantially cylinder jacket-shaped body which can be placed in the oesophagus and is provided with a cylindrical peripheral wall, and is provided on one side with an end wall and a clamping element which can be moved to a clamping position relative to the substantially cylindrical body for the purpose of fixing the seal in the oesophagus, and thereby sealing the oesophagus, by clamping oesophageal tissue between at least a part of the clamping element and the substantially cylindrical body. Oesophageal tissue is here placed round the cylindrical body, after which the clamping element is placed round the cylindrical body and the oesophageal tissue placed round the substantially cylindrical body is clamped between the clamping element and the substantially cylindrical body.

Although the oesophagus can be sealed in simple manner with this known seal, the strength of the closure of the oesophagus obtained with the known seal is limited. As a result of load exerted on the closure during slaughtering of the animal, the obtained closure of the oesophagus can begin to leak or even be broken by the high pressure exerted on the known seal by the substance present in the digestive tract. There is also the risk that as a result of the tensile stresses exerted on the clamped part of the oesophagus during removal of the oesophagus being so high that the obtained closure of the oesophagus may begin to leak or is broken. There is also the risk of the oesophagus not being properly sealed if an object, such as a piece of food or at least partially digested food, is situated between the cylindrical body, oesophageal tissue and the clamping element, whereby the closure may begin to leak. This is undesirable.

There is therefore a need for a seal which better seals an oesophagus of a slaughtered animal. It is an object of the invention to meet said need.

SUMMARY OF THE INVENTION

This object is achieved by a seal of the above stated type, which is characterized in that the peripheral wall encloses a receiving space and is provided with at least one opening through which oesophageal tissue can be carried into the receiving space, and that the clamping element is displaceable to a clamping position located in the receiving space, wherein oesophageal tissue present in the receiving space is clamped between the clamping element and the substantially cylindrical body.

A closure of the oesophagus is hereby obtained with which the oesophagus of a slaughtered animal can be sealed more effectively. Because oesophageal tissue is clamped in the interior of the cylindrical body, a clamping force can thus be obtained which does not depend, or at least depends to lesser extent, on the diameter of the cylinder jacket and/or the clamping element. This also achieves that oesophageal tissue can penetrate into the interior of the cylindrical body, wherein the tissue situated in the interior of the body is anchored by a mechanical locking, this further increasing the strength of the closure. Fatty tissue and tissue situated on the outside of the oesophagus can also be urged into the cylindrical body by using the seal according to the invention.

The seal according to the invention is also less sensitive to contaminants present in the oesophagus, such as food or partially digested food, as well as to misshaping of the oesophagus. By urging the clamping element to a clamping position located in the interior of the cylindrical body, oesophageal tissue present in the interior of the cylindrical body and oesophageal tissue present outside the body is urged against respectively the interior and the outer side of the cylindrical body, whereby a strong closure can be obtained. A medium-tight closure can hereby be obtained. In this context medium is understood to mean liquid and solid components. Although it is also possible with the seal to seal the oesophagus against passage of gases, this is not necessary, or at least less so. In this context cylinder is understood to mean a shape whose peripheral wall (jacket) is closed. The peripheral wall preferably takes a concave form. The opening in the peripheral wall can have various shapes, such as rectangular. The opening is particularly round, such as a circle and an oval, or at least edges of the openings are rounded. This reduces the risk of the seal leaking due to tearing of oesophageal tissue by sharp edges in the opening.

A corresponding method for sealing an oesophagus of a slaughtered animal, such as a cow, comprises of placing a cylindrical part of a seal, provided with a cylindrical peripheral wall and provided with a closing end wall on one end side, at a desired location in the oesophagus of the animal and displacing a clamping element of the seal to a clamping position relative to the cylindrical part, wherein oesophageal tissue is clamped fixedly between the clamping element and the cylindrical part, wherein oesophageal tissue is urged through at least one opening located in the peripheral wall into the interior of the cylindrical part, and the thus displaced tissue is clamped fixedly between the clamping element moved to a clamping position and the cylindrical part. The advantages of this method according to the invention correspond to the advantages as described for the seal according to the invention.

It is noted that the invention as described here is intended for sealing the oesophagus of a slaughtered animal. It is assumed that the measures of the invention can likewise be used to seal the rectum of a slaughtered animal, where a similar problem occurs.

In a first embodiment the peripheral wall is provided with at least two openings distributed over the periphery of the peripheral wall. The strength of the closure hereby increases further because more oesophageal tissue can be carried into the interior of the body and because the distance over which oesophageal tissue extends on the outside of the peripheral wall is reduced. This results in a greater clamping area of the tissue, and thereby to a greater clamping force. The sum of the greatest length of the openings in peripheral direction of the peripheral wall in particular covers more than 50% of the periphery of the peripheral wall, and preferably more than 75% of the periphery of the peripheral wall. More oesophageal tissue can hereby be urged into the cylindrical body, whereby more oesophageal tissue is situated in the interior of the cylindrical body, thereby increasing the degree of mechanical closure of tissue present in the interior of the cylindrical body. This increases the strength of the closure.

The closing end wall can be formed in various ways. The end wall can thus take a flat form. The end wall particularly takes an at least partially conical, flattened or rounded form. This facilitates the placing of the body into the oesophagus.

Although it is not precluded that the cylindrical body and the clamping element are moved to the desired position in the oesophagus at a distance from each other, according to an embodiment the cylindrical body comprises first fixation means for fixing the clamping element in a position for placing the seal in the oesophagus. By providing the cylindrical body with first fixation means the clamping element is engaged in a position relative to the cylindrical body in which the seal can be carried in simple manner through the oesophagus to a desired location in the oesophagus.

In another embodiment the cylindrical body comprises second fixation means for fixing the clamping element in a clamping position. By providing the cylindrical body with second fixation means the clamping element is engaged in the clamping position by the cylindrical body, thereby reducing the risk of an undesired displacement of the clamping element relative to the cylindrical body. This further increases the strength of the closure of the oesophagus.

The fixation means can take diverse forms, wherein the clamping element is fixed in diverse ways to the cylindrical body. The fixation means are particularly adapted to fix the clamping element by means of form-locking. This improves the reliability of the fixation of the clamping element to the cylindrical body. The fixation means can comprise at least one protrusion and/or a recess for engaging respectively a recess or protrusion of the clamping element. In an embodiment the first and/or second fixation means comprise at least one recess arranged in the peripheral wall for receiving a protrusion of the clamping element. This is structurally simple. The recess of the second fixation means can be embodied integrally with the openings located in the peripheral wall. For co-action with the fixation means of the cylindrical body the clamping element comprises at least one protrusion. The at least one protrusion of the clamping element is particularly adapted to co-act with both the first fixation means and the second fixation means of the cylindrical body.

For coupling the cylindrical body to a carrier for the purpose of positioning through a part of the oesophagus to a desired location in the oesophagus, the cylindrical body comprises coupling means. Making use of a carrier the cylindrical body can hereby be carried in reliable manner through the oesophagus to a desired location in the oesophagus.

In another embodiment the coupling means comprise resilient tongues mounted on the edge of the cylindrical body remote from the end wall and extending in axial direction, which tongues are provided on their inner side with inward extending engaging elements which are adapted to engage behind an edge of the carrier. The carrier can hereby be easily coupled to the seal by placing the carrier into the cylindrical body by a temporary deformation of the tongues, after which the tongues engage round an edge of the carrier and hold the carrier fixedly.

The clamping element can be embodied in diverse ways. What is important is that the clamping element can be placed at least partially into the cylindrical body. According to a preferred embodiment, the clamping element is annular. An equal distance between the clamping element and the cylinder jacket can hereby be obtained around the clamping element, whereby the oesophageal tissue is clamped uniformly between the clamping element and the cylindrical body. The clamping element is particularly provided here on an edge with at least one protrusion for clamping oesophageal tissue, which is present in the interior of the cylindrical body, between at least a part of the protrusion and the cylindrical body. Oesophageal tissue can also be clamped by oesophageal tissue being urged in the direction of the end wall by the clamping element, wherein the clamping element at least partially closes the openings in the peripheral wall of the cylindrical body. Because the second fixation means fix the clamping element in a clamping position here, the oesophageal tissue is enclosed in form-locking manner in the cylindrical body. The protrusion of the clamping element can also be provided with means for engaging the clamping element with the first and/or second fixation means of the cylindrical body. These means forming part of the clamping element particularly comprise a protrusion for engaging the clamping element through a recess of the cylindrical body. These means can also be embodied integrally with the protrusion in order to increase the clamping surface area. The oesophageal tissue can hereby be clamped well between the clamping element and the cylindrical body.

For a further increase in the strength of the closure at least part of a clamping surface of the cylindrical body and/or the clamping element is provided with a relief. In this context relief is understood to mean, among others, a surface roughness and protrusions and recesses such as grooves, flanges, edges and so on.

The diameter of the cylindrical body can be variable. The diameter of the cylindrical body can thus be greater than the diameter of the oesophagus of the animal to be slaughtered, whereby a strong closure can be obtained. The diameter can also be smaller than the diameter of the oesophagus of the animal to be slaughtered, whereby the cylindrical body can be moved with a relatively small force through the oesophagus to the desired location. The outer diameter of the cylindrical body lies particularly between 30 and 55 mm. It has been found that a cylinder jacket with a diameter within this range can be readily placed at a desired position in an oesophagus, whereby a closure can also be obtained with a sufficiently high strength in the case of cattle.

The cylindrical body and the clamping element can be manufactured from variable materials. The cylindrical body and/or the clamping element is particularly manufactured substantially from a material selected from the group consisting of: a plastic, a biologically degradable material and an edible material. A plastic, and in particular a mouldable plastic, enables simple production of the cylindrical body and the clamping element. A biologically degradable material, such as polylactic acid and thermoplastic starch, is environmentally-friendly and can optionally be discharged in combination with meat unfit for human consumption. An edible material, such as thermoplastic starch with edible additives, has the advantage that it can be processed into food, particularly animal food, in combination with meat of the slaughtered animal. In another embodiment the cylindrical body and the clamping element are provided with mutually engaging means defining each other's relative rotation position. An improved securing of the clamping element relative to the cylindrical body can hereby be obtained. The mutually engaging means defining each other's relative rotation position are particularly adapted to place the protrusions with the clamping element in the clamping position substantially opposite the openings located in the peripheral wall. A liquid-tight closure of the oesophagus can hereby be obtained with an increased strength.

The invention also provides a cylindrical body and a clamping element for use in a seal according to the present invention. The advantages of the cylindrical body and the clamping element according to the invention correspond to the advantages as described in respect of the seal according to the invention.

The invention also provides a device for placing and fixing a seal in the oesophagus of a slaughtered animal, such as a cow, wherein the device comprises a carrier placed at a first end of an elongate element for positioning a seal through a part of the oesophagus and at a desired location in the oesophagus, first urging means controllable from the second end of the elongate element for urging oesophageal tissue through an opening of a cylindrical part of the seal into the interior of the cylindrical part, and second urging means controllable from the second end of the elongate element for urging a clamping element of the seal to a clamping position relative to the cylindrical part, wherein oesophageal tissue present in the interior of the cylindrical part is clamped fixedly in the clamping position. This device makes it possible to seal an oesophagus in simple manner using the cylindrical body and the clamping element according to the invention. Because the device is provided with a carrier, the cylindrical body can be easily positioned through a part of the oesophagus and at a desired location in the oesophagus. The second urging means make it possible in simple manner to displace the clamping element relative to the cylindrical body to the clamping position. The clamping element can here extend substantially or wholly outside the cylindrical body and be carried by the second urging means at least partially into the cylindrical part to the clamping position. Prior to placing of the seal in the oesophagus the clamping element is preferably situated substantially in the cylindrical body, whereby the seal has a more compact form during moving of the seal through the oesophagus to a desired location. In a corresponding method the clamping element in the interior of the cylindrical part is moved to a clamping position located inside the cylindrical part. It is otherwise not precluded that in other embodiments the clamping element is moved to the desired position in the oesophagus separately of the cylindrical part, and the clamping element is then moved into the clamping position.

The elongate element can be embodied in various ways. The elongate element can thus be given a substantially straight form, this being structurally simple. The elongate element is preferably at least partially arcuate. During the movement of the seal through the oesophagus to a desired location the oesophagus will hereby be displaced away from its natural position, whereby the oesophagus will be forced against an anatomical structure of the slaughtered animal. A stop can hereby be obtained, which can be used to position the seal at a desired location. The elongate element is preferably dimensioned to displace the oesophagus in dorsal direction until this displacement is stopped by the midriff of the slaughtered animal. A user can hereby determine in simple manner, without additional measures, whether the desired location in the oesophagus has been reached.

The oesophageal tissue can be urged into the cylindrical body in variable manner. Means can for instance be used for this purpose which anchor and pull the tissue into the interior of the cylindrical body. The first urging means preferably comprise vacuum means for creating an underpressure in the interior of a cylindrical body placed in the oesophagus, whereby oesophageal tissue is urged through openings arranged in the cylindrical body into the interior of the body. The vacuum means here preferably comprise a channel which can be connected to a vacuum pump, extends through the elongate element and debouches at the first carrier. This is a structurally simple solution for applying an underpressure in the cylindrical body.

A corresponding method is characterized in that oesophageal tissue is urged into the interior of the cylindrical part by applying an underpressure in the interior of the cylindrical part. This is a clean and simple method of urging oesophageal tissue into the interior of the cylindrical body. The underpressure is preferably such that fatty tissue and tissue present on the outside of the oesophagus is also urged into the interior of the cylindrical body, whereby an improved closure of the oesophagus is obtained.

When operated, the second urging means can be moved so that a user of the device can readily move the clamping element in axial direction at least partially into the interior of the cylindrical body.

Once the oesophagus is sealed, the oesophagus can be severed at a desired location on the side of the device remote from a digestive tract connecting to the oesophagus. A separate knife can for instance be used for this purpose. The device particularly comprises a knife placed at the first end of the elongate element for severing the oesophagus on the side of the seal remote from the stomach. The oesophagus can be severed at a desired location in simple manner by providing the device with a knife. A user can sever the oesophagus precisely at a desired location by connecting the knife to the device at a pre-known position relative to the clamping position. In a corresponding method the oesophagus is severed on the side of the seal remote from the stomach after sealing of the oesophagus. The knife can be given a variable form. The knife is in particular a substantially circular knife rotatable about an axis and drivable in rotation, this simplifying severing of the oesophagus. The knife is particularly adapted to twist the oesophagus at the position of the knife. By rotating the knife the oesophagus is twisted locally so that the tissue of the oesophagus is urged with a great pressure against the knife. The relatively elastic and tough material of the oesophagus can hereby be severed effectively, i.e. with a limited number of rotations of the knife. According to a corresponding method, the oesophagus is twisted about its longitudinal axis during severing in order to increase the pressure between the oesophagus and the cutting surface of a knife.

Although the knife can be manufactured from diverse materials, the knife is preferably manufactured substantially from metal or a ceramic, this providing the knife with a good wear resistance. The knife can be connected to the shaft concentrically, whereby the knife rotates during operation without possibly undesirable vibrations, and eccentrically, whereby peak stresses are obtained in the oesophagus. Due to the peak stresses a start of an incision in the oesophagus can be obtained in simple manner. The knife can also have a shape deviating to greater or lesser extent from circular, whereby the same effect can be achieved as with an eccentrically placed circular knife.

In an advantageous embodiment the device comprises a protective sleeve displaceable relative to the carrier, which protective sleeve is displaceable between a position closing openings located in the peripheral wall and a position for urging oesophageal tissue through the openings located in the peripheral wall into the receiving space of the cylindrical body. The seal can hereby be carried in simple manner through the oesophagus to a desired location, wherein the openings located in the peripheral wall are closed so that the receiving space of the cylindrical body and the part of the oesophagus remote from the stomach remains relatively clean. When the seal is placed at the desired location in the oesophagus, oesophageal tissue can be urged into the receiving space of the cylindrical body by only moving the protective sleeve to a position for urging oesophageal tissue through the openings located in the peripheral wall into the receiving space of the cylindrical body.

In another embodiment the carrier comprises an edge for receiving resilient tongues mounted on the edge of the cylindrical part remote from an end wall and extending in axial direction, which tongues are provided on their inner side with inward extending coupling means formed as engaging elements, and the device comprises a protective sleeve displaceable relative to the carrier, which protective sleeve is displaceable to a position in which the protective sleeve extends round the edge. In this manner A simple blocking of the cylindrical part of the seal on the carrier is in this way obtained. The cylindrical part is fixed to the carrier merely by displacing the protective sleeve to the position in which the protective sleeve extends round the edge. The device can hereby be used reliably to position the seal through the oesophagus at a desired location in the oesophagus at a desired position, and the clamping element can be moved in reliable manner to its clamping position without the cylindrical part detaching from the carrier.

The cylindrical body and the clamping element can be placed in various ways through the oesophagus to the desired location in the oesophagus. The cylindrical part and the clamping element can thus be carried through the mouth of the animal to the desired location in the oesophagus. This is a clean manner of carrying the cylindrical body and the clamping element to the desired location, and no further operations are necessary.

Because no skin incision is required, the risk of meat intended for human consumption being contaminated by bacteria such as the '*Escherichia coli*' is reduced. Such bacteria is after all usually present on the hide and in the fur of the animal. The oesophagus can initially also be severed a short distance from the mouth of the animal, and the cylindrical part and the clamping element can be carried through the severed part of the oesophagus to the desired location in the oesophagus. This method is used in the case of 'halal' slaughtering. The distance over which the cylindrical body and the clamping element are displaced through the oesophagus to the desired location in the oesophagus can hereby be shortened.

BRIEF DESCRIPTION OF THE DRAWINGS

The present invention will be further elucidated on the basis of the non-limitative exemplary embodiments shown in the following figures. Herein:

FIG. 12a shows a front view of a device for sealing an oesophagus of an animal to be slaughtered, such as a cow, according to the present invention, provided with the cylindrical body of FIG. 1 and the clamping element of FIG. 5, before arranging of the seal on the device;

FIG. 12b shows a view corresponding to FIG. 12a with a seal arranged on the device;

DETAILED DESCRIPTION OF THE PREFERRED EMBODIMENTS

Figure 1:
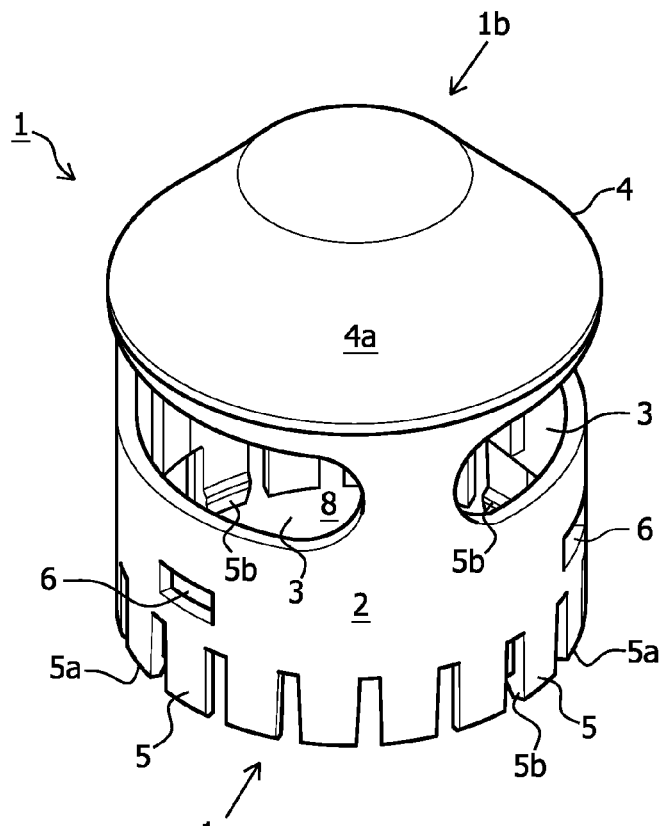
FIG. 1 shows a perspective view of a cylindrical body according to the present invention.

FIG. 1 shows a cylindrical body 1 which forms part of a seal according to the present invention. Arranged in peripheral direction in a cylindrical peripheral wall 2 of cylindrical body 1 are three through-openings 3, two of which are shown. An end side 1a of cylindrical body 1 is opened. The opposite end side 1b of cylindrical body 1 is provided with a closing end wall 4. End wall 4 is truncated and comprises a conical part 4a. On the open side 1a of cylindrical body 1 the cylindrical body 1 comprises resilient tongues 5 arranged in peripheral direction of peripheral wall 2 and extending in axial direction, which tongues are provided at their end 5a with inward extending protrusions 5b. The three openings 3 take an elongate form, wherein the short sides are rounded. The sum of the greatest length of openings 3 covers more than 75% of the periphery of peripheral wall 2.

Figure 2:
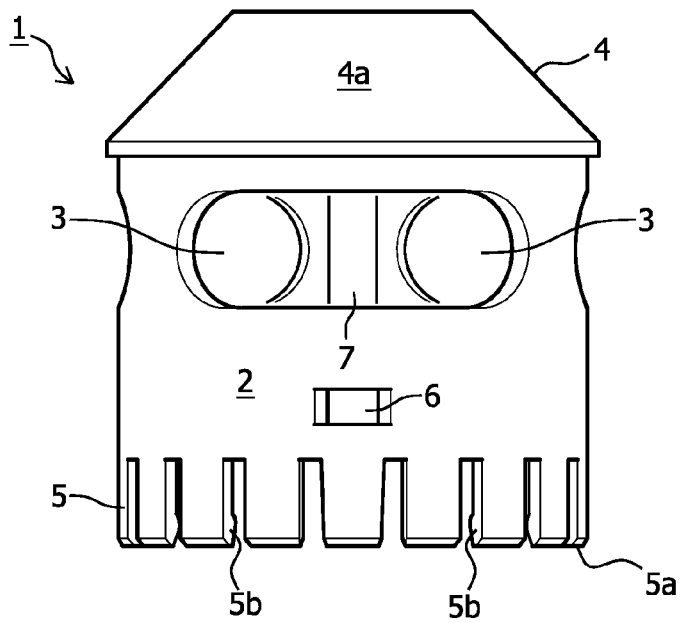
FIG. 2 shows a front view of the cylindrical body of FIG. 1.
Figure 3:
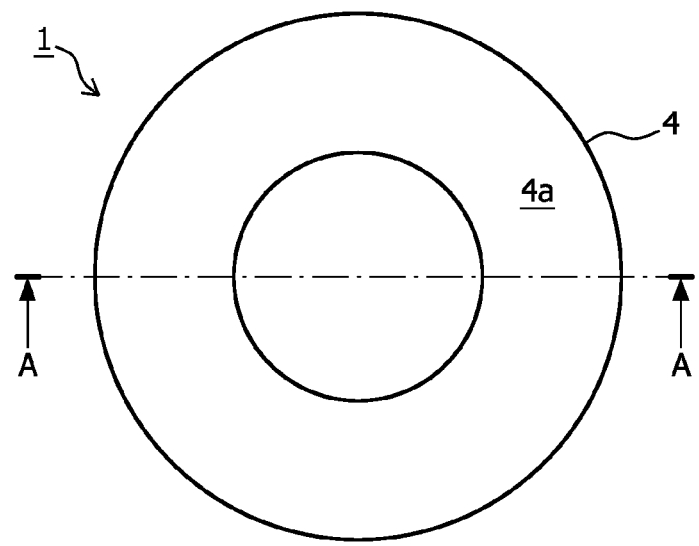
FIG. 3 shows a top view of the cylindrical body of FIG. 1.
Figure 4:
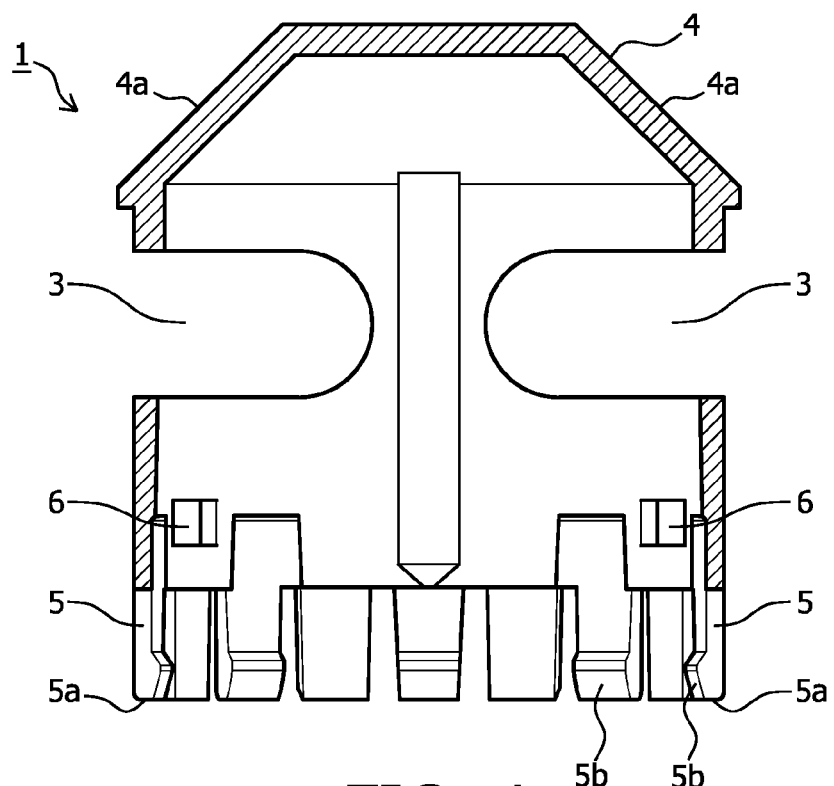
FIG. 4 shows a cross-sectional view along line A-A in FIG. 3.
Figure 5:
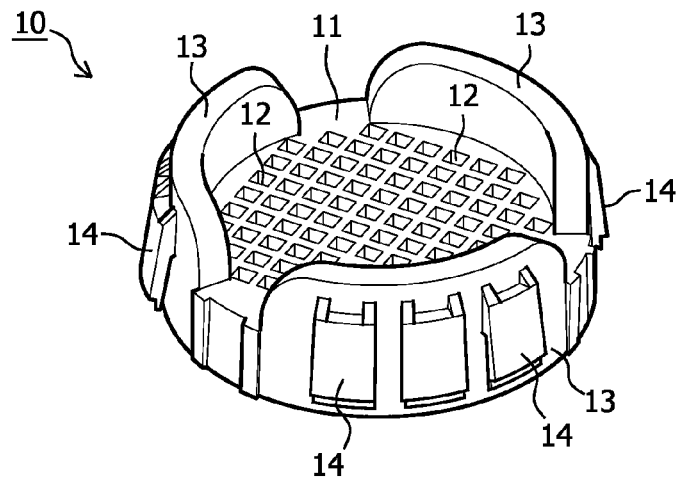
FIG. 5 shows a perspective view of a clamping element according to the present invention.
Figure 9:
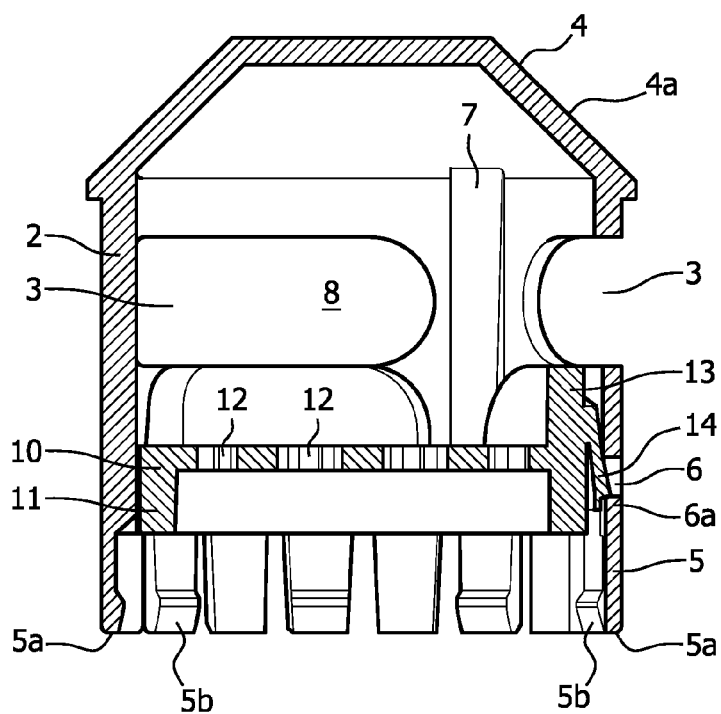
FIG. 9 shows a cross-section of the seal of FIG. 9 wherein the clamping element of FIG. 5 is placed in the cylindrical body of FIG. 1 in a position leaving oesophageal tissue free.

Peripheral wall 2 is provided with recesses 6 for the purpose, in co-action with protrusions of a clamping element of FIG. 5 forming part of the seal, of holding the clamping element in cylindrical body 1 in a position leaving oesophageal tissue free, as also shown in FIG. 9. Defining of the relative rotation of the protrusions of the clamping element relative to recesses 6 of cylindrical body 1 is obtained by a guide 7 extending in longitudinal direction of cylindrical body 1 and located on the inner side of peripheral wall 2. Cylindrical body 1 encloses a receiving space 8. FIG. 2 shows a front view of cylindrical body 1. FIG. 3 shows a top view of cylindrical body 1. FIG. 4 shows a cross-sectional view of cylindrical body 1 along the line A-A in FIG. 3.

Figure 6:
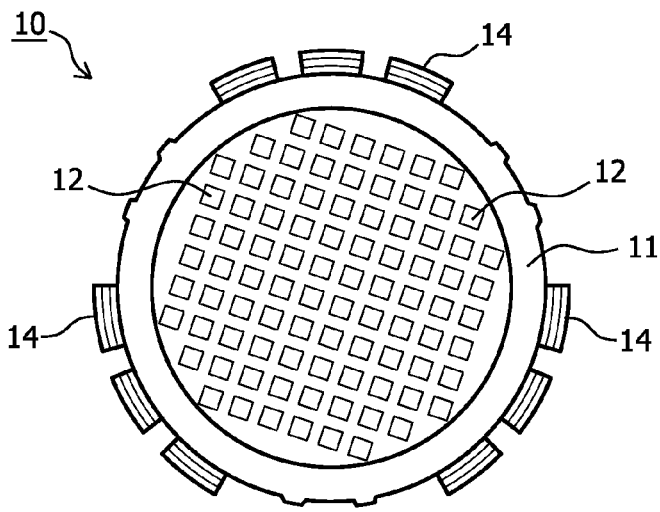
FIG. 6 shows a top view of the clamping element of FIG. 5.
Figure 7:
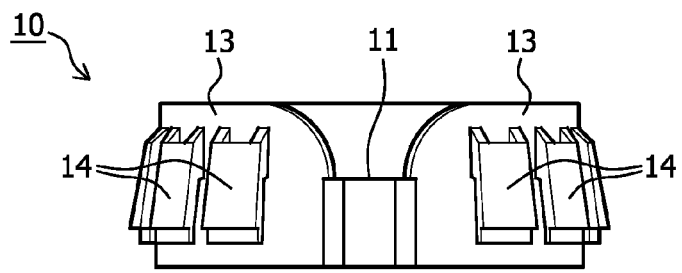
FIG. 7 shows a front view of the clamping element of FIG. 5.

FIG. 5 shows a clamping element 10 which is adapted for co-action with the above described cylindrical body 1, and wherein the parts together form a seal. Clamping element 10 comprises a circular base 11 which is provided with a plurality of through-openings 12 for forming a filter in base 11. Three lips 13 are connected to base 11 over the periphery of base 11. On the side of lips 13 remote from base 11 protrusions 14 are connected to lips 13 for the purpose, in co-action with recesses 6 of cylindrical body 1, of holding clamping element 10 in cylindrical body 1 in a position leaving oesophageal tissue free (see also FIG. 9). Lips 13 are distributed over the periphery of the base such that they correspond with openings 3 distributed over the periphery of peripheral wall 2 of cylindrical body 1. FIG. 6 shows a top view of clamping element 10. FIG. 7 shows a front view of clamping element 10.

Figure 8:
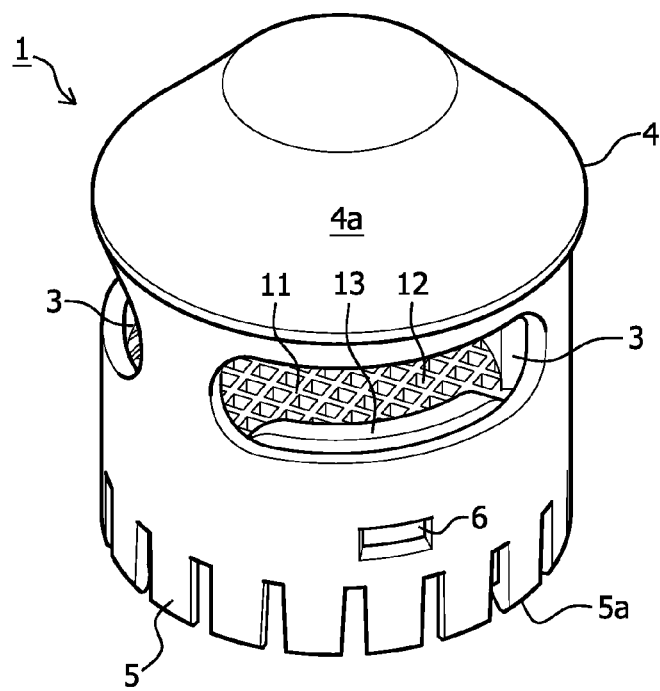
FIG. 8 shows a perspective view of a seal according to the present invention, wherein the clamping element of FIG. 5 is placed in the cylindrical body of FIG. 1 in a position leaving oesophageal tissue free.

FIG. 8 shows a seal according to the invention comprising cylindrical body 1 and clamping element 10. Clamping element 10 is placed in cylindrical body 1 in a position leaving oesophageal tissue free. This can be seen more clearly in FIG. 9, which shows a cross-section of cylindrical body 1, in which clamping element 10 is placed in a position leaving oesophageal tissue free. This FIG. 9 shows that protrusions 14 of clamping element 10 rest on edges 6a of recesses 6 in peripheral wall 2 of cylindrical body 1. The mutual alignment of protrusions 14 relative to recesses 6 in rotation direction is obtained with guide 7.

Figure 10:
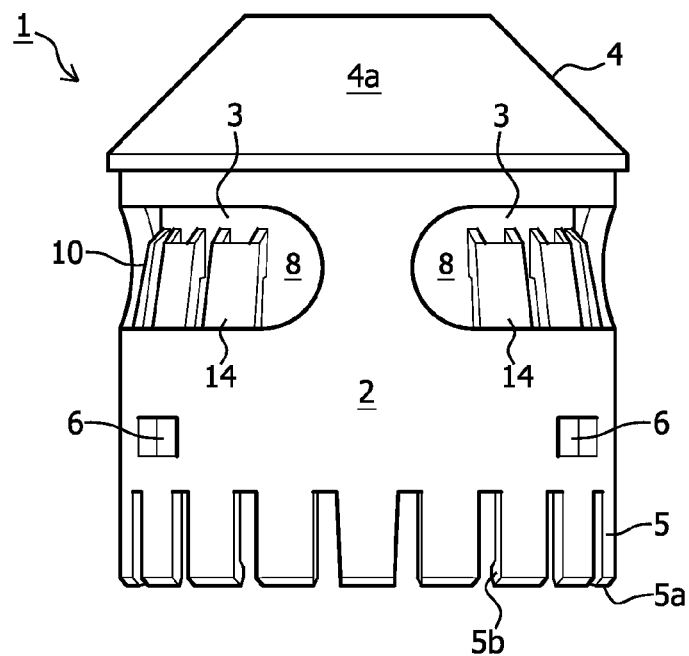
FIG. 10 shows a front view of the cylindrical body of FIG. 1 wherein the clamping element of FIG. 5 is placed in a position clamping oesophageal tissue.
Figure 11:
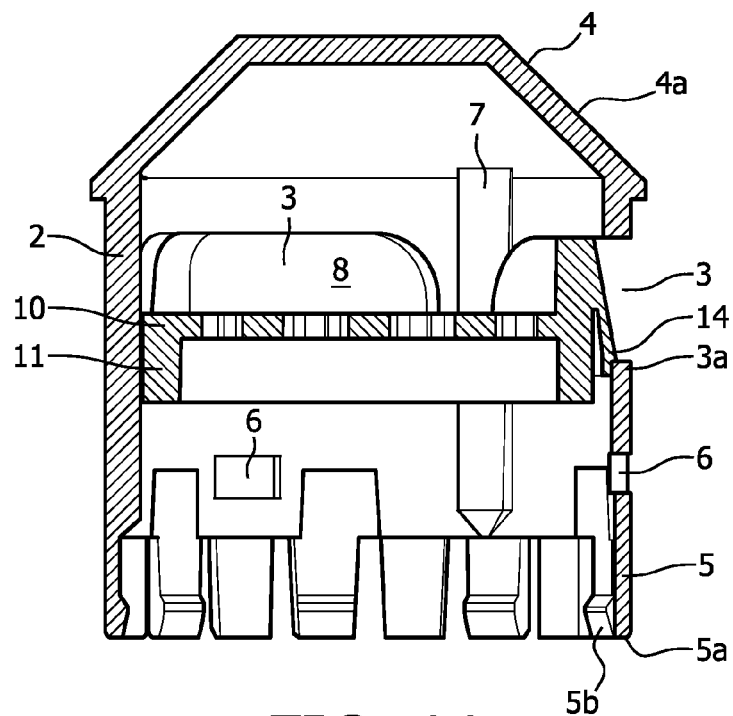
FIG. 11 shows a cross-section of the cylindrical body of FIG. 1, wherein the clamping element of FIG. 5 is placed in a position clamping oesophageal tissue.

FIG. 10 shows cylindrical body 1 in which clamping element 10 is placed in a position clamping oesophageal tissue, this position being designated as clamping position. For this purpose protrusions 14 of clamping element 10 rest on edges 3a of openings 3 in peripheral wall 2. If tissue of the oesophagus extends in receiving space 8 of cylindrical part 1, it is clamped between clamping element 10 and peripheral wall 2. FIG. 11 shows a cross-section of cylindrical body 1 in which clamping element 10 is placed in a position clamping oesophageal tissue.

The operation of the seal of FIG. 8 is explained on the basis of a device 30 for placing a seal as shown in FIGS. 12a-12h in the oesophagus of a slaughtered animal.

Figure 12C:
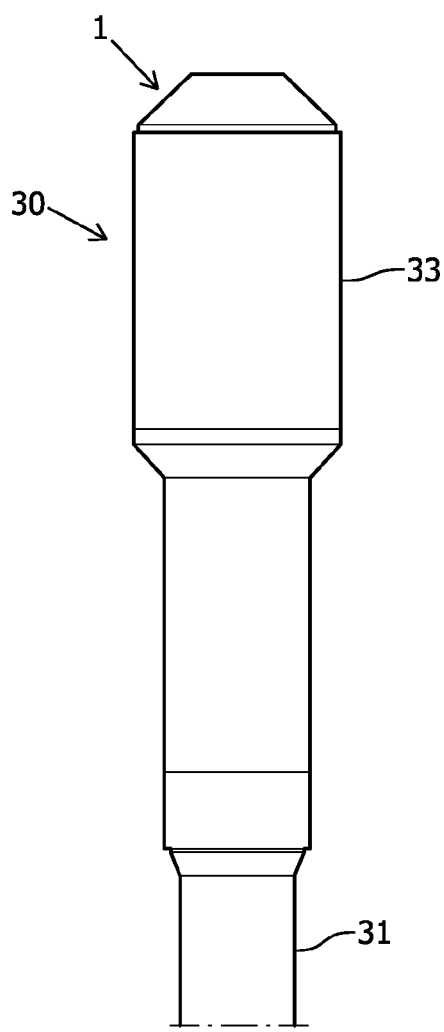
FIG. 12c shows a view corresponding to FIG. 12a in the starting position.

FIG. 12a shows a device 30 for placing a seal in the oesophagus of a slaughtered animal, which seal is formed by a cylindrical body 1 as shown in FIG. 1 and a clamping element 10 as shown in FIG. 5, this clamping element 10 being placed inside cylindrical body 1. Device 30 comprises an elongate element formed as a tube 31. Connected to tube 31 at a first end thereof is a carrier 32 provided with an edge 32a for fixing cylindrical body 1 to carrier 32 via the resilient tongues 5 of cylindrical body 1, this position being shown in FIG. 12b. Clamping element 10 is here fixed with cylindrical body 1 in a position for placing the seal in the oesophagus. Device 30 is provided with a protective sleeve 33, the inner diameter of which has substantially the same diameter as the outer diameter of cylindrical body 1, wherein protective sleeve 33 can be placed over cylindrical body 1 as shown in FIG. 12c. In this position protective sleeve 33 extends beyond openings 3 of cylindrical body 1, i.e. as far as end wall 4. The seal formed by cylindrical body 1 and clamping element 10 can hereby be placed through an oesophagus up to a desired location in the oesophagus without substance, such as food or at least partially digested food, being able to enter the receiving space of cylindrical body 1. In this embodiment device 30 with cylindrical body 1 and clamping element 10 placed thereon is inserted into the oesophagus through the mouth of the animal.

Figure 12D:
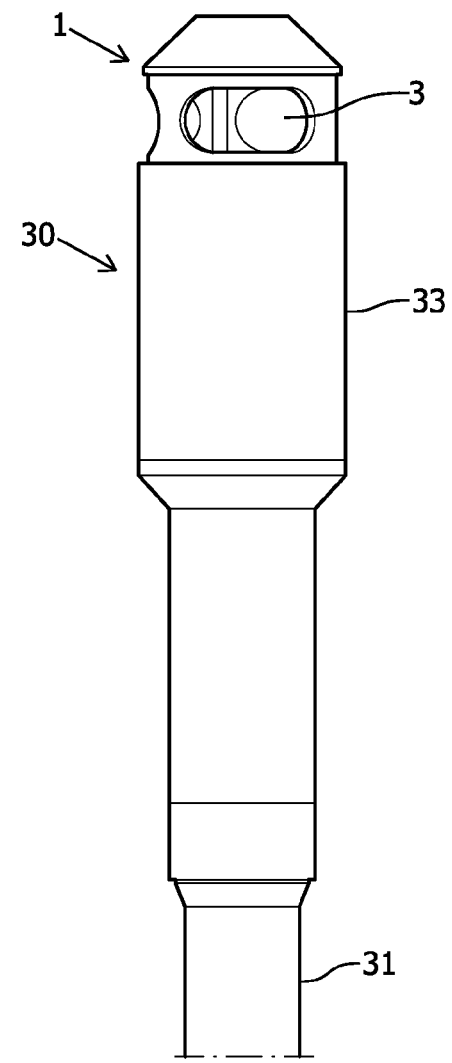
FIG. 12d shows a view corresponding to FIG. 12a, wherein oesophageal tissue can be urged through openings in the peripheral wall into the cylindrical body.

When cylindrical body 1 is placed at the desired location in the oesophagus, protective sleeve 33 is displaced downward relative to cylindrical body 1, whereby openings 3 are left clear as shown in FIG. 12d. In this orientation an underpressure is applied in receiving space 8 of cylindrical body 1 from a per se known vacuum pump (not shown here) and first urging means connected to the vacuum pump and formed by a channel extending through tube 31 into receiving space 8 of cylindrical body 1. Oesophageal tissue is urged into receiving space 8 by the underpressure in receiving space 8. The underpressure is preferably such that fatty tissue on the outside of the oesophagus is also urged into receiving space 8, whereby an improved closure of the oesophagus is obtained since the volume of the fatty tissue situated in the receiving space of cylindrical body 1 provides for a form-locking coupling of clamping element 10 and cylindrical body 1 to the oesophagus. In this situation, where the underpressure is applied and oesophageal tissue extends into receiving space 8 of cylindrical body 1, the oesophagus is already sealed and a pressure can be exerted on the seal, for instance by liquid present in the oesophagus.

Figure 12E:
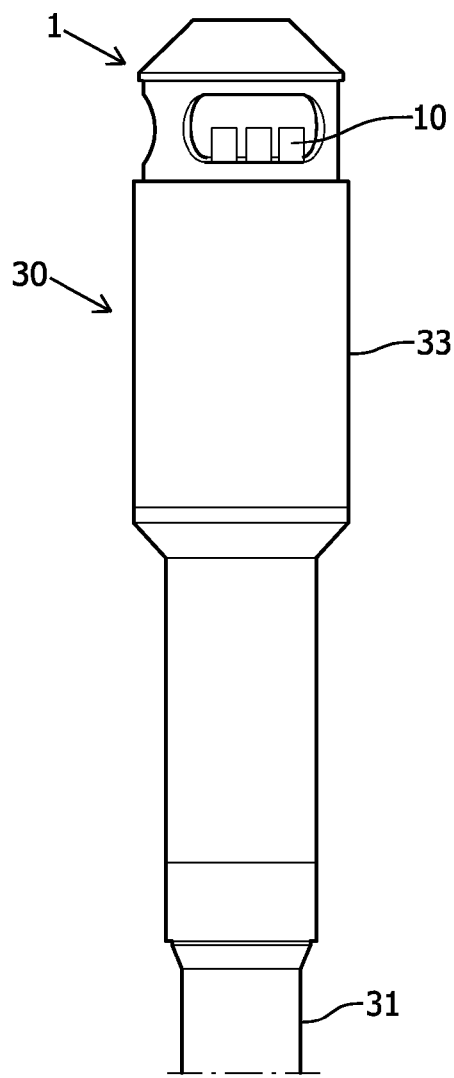
FIG. 12e shows a view corresponding to FIG. 12a in a position in which the oesophageal tissue is clamped.

As shown in FIG. 12e, clamping element 10 is then urged to openings 3 of cylindrical body 1 by second urging means 34 extending in tube 31, wherein lips 13 of clamping element 10 are located substantially opposite openings 3. In this situation protrusions 14 of clamping element 10 rest on edges 3a of openings 3, as also shown in FIG. 11. Clamping element 10 hereby camps the oesophageal tissue situated in receiving space 8 between lips 13 of clamping element 10 and peripheral wall 2. The underpressure applied in receiving space 8 can be removed. The closure of the oesophagus is secured by placing clamping element 10 into a clamping position in cylindrical body 1. If desired, the side of the clamped part of the oesophagus remote from the stomach of the slaughtered animal can be washed clean and/or sterilized.

Figure 12F:
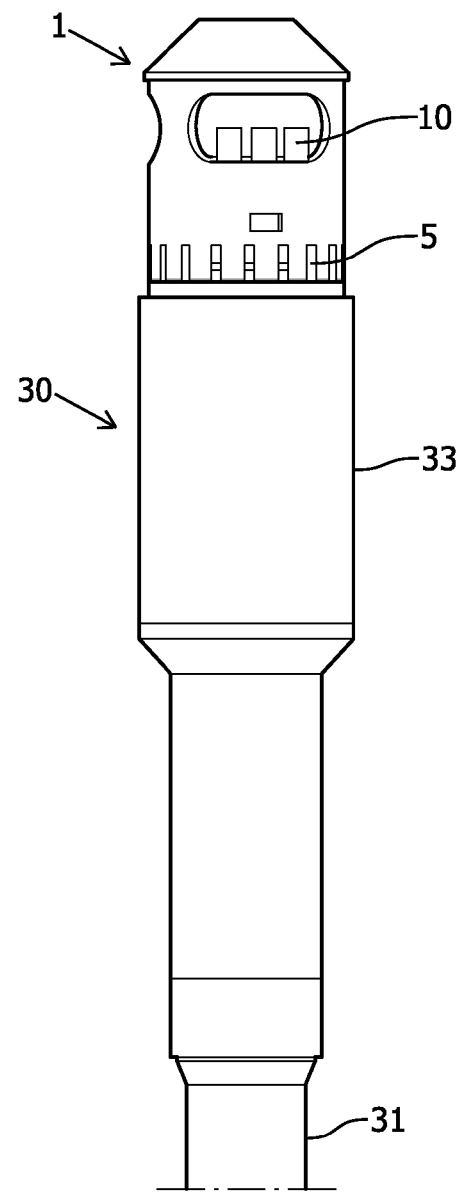
FIG. 12f shows a view corresponding to FIG. 12a in a cutting position, wherein the protective sleeve first releases the knife.
Figure 12G:
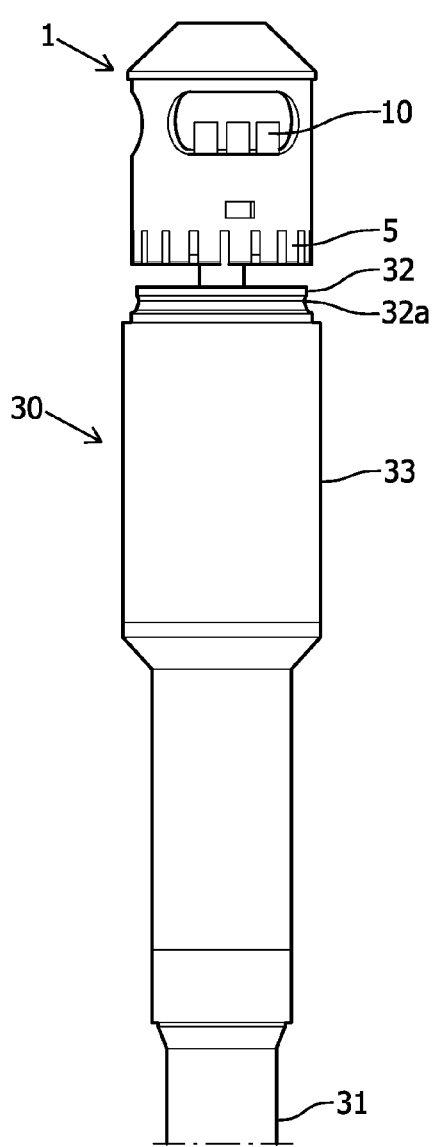
FIG. 12g shows a view corresponding to FIG. 12a in an uncoupling position prior to washing or sterilizing.

Carrier 32 must be uncoupled from the seal formed by cylindrical body 1 and clamping element 10 in order to enable withdrawal of device 30 from the oesophagus. For this purpose protective sleeve 33 is moved in the direction of tube 31 so that edge 32 and the resilient tongues 5 extending around the edge are released (see FIG. 12f). Carrier 32 is moved relative to device 30 in the direction of the seal via second urging means 34. Cylindrical body 1 is hereby uncoupled from carrier 32 as shown in FIG. 12g. Device 30 can be withdrawn and taken out of the oesophagus, this being shown in FIG. 12h. The closure in the oesophagus remains sufficiently strong even after the removal of device 30. The slaughtered animal can be further processed.

Figure 13:
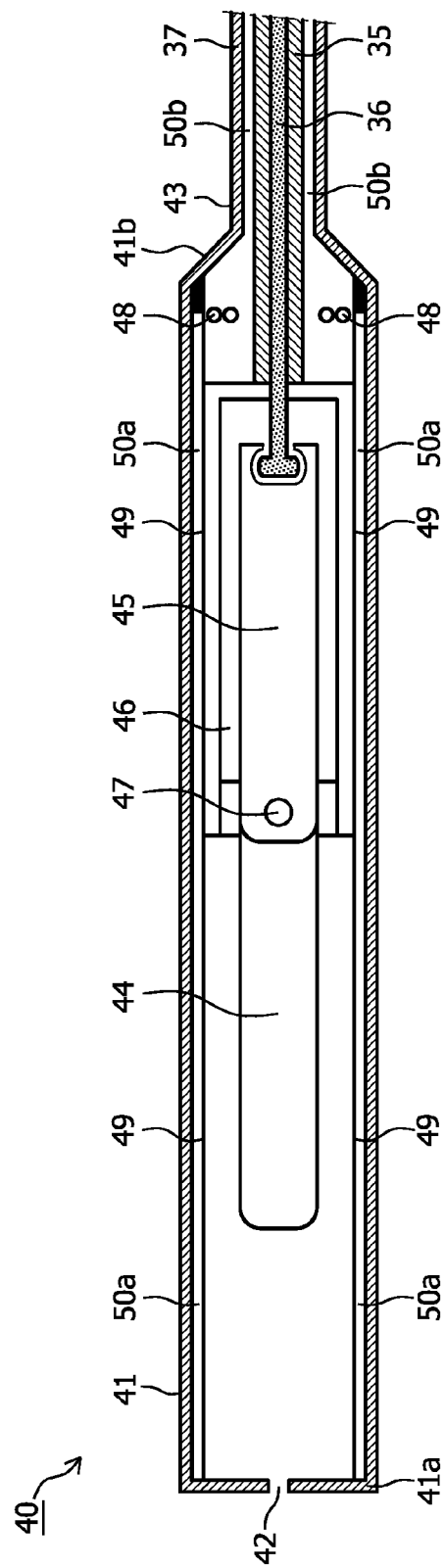
FIG. 13 is a cross-sectional view of an operating tool for operating the device shown in FIG. 12.

Referring to FIG. 13, an operating tool designated as a whole with 40 is shown. Operating tool 40 comprises a housing 41, provided at a first short end 41a with a first opening 42 and at a second short end 41b with a second opening 43. A peripheral wall 49 is placed inside housing 41, whereby a space 50a is obtained between housing 41 and peripheral wall 49. A vacuum pump and/or a hose can be connected to operating tool 40 in order to respectively apply an underpressure in space 50a or allow a fluid to flow through the space for washing or sterilizing purposes.

Space 50a is brought into open connection with a space 50b located between hose 37 and jacket 35 through openings 48 present in peripheral wall 49 close to the second short end 41b. An underpressure can hereby be applied in a seal coupled to carrier 32, and water or other suitable fluid can be transported in the direction of the carrier and through the seal. A first actuator 44 and a second actuator 45 are placed in the space enclosed by peripheral wall 49. First actuator 44 is coupled mechanically to jacket 35 via a coupling 46 and to second actuator 45 by means of a connection 47. Connection 47 is embodied such that, when first actuator 44 is displaced in the direction of the second short end 41b, first actuator 44 also urges second actuator 45 in the direction of the second short end 41b, but that first actuator 44 does not move relative to housing 41 when second actuator 45 is displaced in the direction of the second short end 41b. By displacing first actuator 44 a jacket 35 and an inner cable 36 can be displaced relative to a hose 37 lying round jacket 35 and inner cable 36.

Jacket 35 and inner cable 36 extend here through opening 43 of housing 41. Electrical cables and control cables can be carried through opening 42 of housing 41 in order to provide electrical energy and signals for controlling first and second actuators 44, 45. A hose can also be coupled to housing 41 through opening 42, whereby water or other desired fluid can be guided through the space enclosed by the housing and discharged through through-openings 48 located in housing 41. The oesophagus and/or the seal can hereby be cleaned or sterilized at a desired position.

A fluid is preferably carried in the direction of the seal when the seal is placed at a desired position in the oesophagus as shown in FIG. 12g. By displacing only second actuator 45 only inner cable 36 is moved relative to hose 37. Jacket 35 is coupled mechanically to carrier 32 and the inner cable is coupled mechanically to second urging means 34, see also FIG. 12a. The seal is urged into protective sleeve 33 by displacing jacket 35 in the direction of the first short end 41a while operating first actuator 44. This takes place in the situation as shown in FIG. 12b, whereby the situation as shown in FIG. 12c is obtained. In this situation the seal can be introduced into the oesophagus.

Figure 12H:
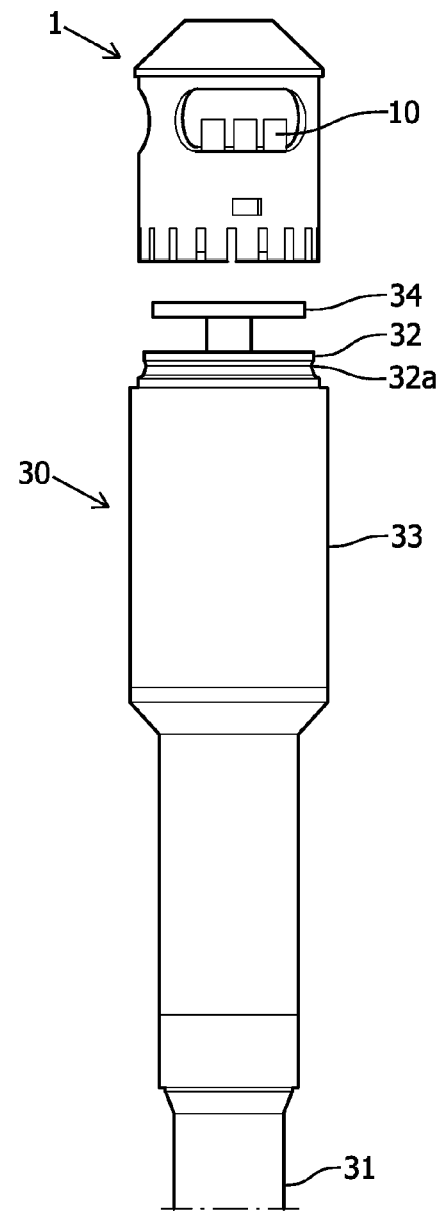
FIG. 12h shows a view corresponding to FIG. 12a in an uncoupled position.

When the seal has been placed at the correct position, the seal is urged partially out of protective sleeve 33, as shown in FIG. 12d, by displacing jacket 35 in the direction of the second short end 41b while operating first actuator 44. In this situation oesophageal tissue can be urged into cylindrical body 1. When sufficient oesophageal tissue has been urged into the cylindrical body, clamping element 10 is urged further into cylindrical body 1 by displacing inner cable 36 in the direction of the second short end 41b while operating second actuator 45, until clamping element 10 is fixed to cylindrical body 1, as shown in FIG. 12e. By displacing jacket 35 in the direction of the second short end 41b while operating first actuator 44 the seal is displaced wholly out of protective sleeve 33 so that resilient tongues 5 are situated wholly outside protective sleeve 33, as shown in FIG. 12f. With a further displacement of inner cable 36 in the direction of the second short end 41b while operating second actuator 45 the seal formed by cylindrical body 1 and clamping element 10 fixed to cylindrical body 1 is then urged in a direction away from the device, whereby the seal is uncoupled from carrier 32, as shown in FIG. 12g. With a displacement of inner cable 36 in the direction of the first short end 41a while operating second actuator 45 the second urging means 34 are wholly withdrawn from cylindrical body 1, as shown in FIG. 12h. Device 30 can then be fully withdrawn from the oesophagus.

It will be apparent that the embodiments of the invention shown here are not limitative and that they may vary. It is finally noted that the rotating knife according to the above stated embodiment can also be applied individually, i.e. without a device for arranging the seal and with or without cleaning, washing or sterilizing system. There is therefore also the option of applying the seal, the method or the device for arranging the seal in the rectum of a slaughtered animal, this likewise being the case for the knife per se or in combination with a cleaning, washing or sterilizing system.

The invention claimed is:

1. A seal for the oesophagus of a slaughtered animal, such as a cow, comprising:
    a cylindrical body which is adapted to be placed in the oesophagus and which has a cylindrical peripheral wall provided on one side with an end wall; and
    a clamping element which is adapted to be displaced relative to the cylindrical body to a clamping position for the purpose of fixing the seal in the oesophagus, and thereby sealing the oesophagus, by clamping oesophageal tissue between at least a part of the clamping element and the cylindrical body,
    wherein the peripheral wall encloses a receiving space and is provided with at least one opening through which oesophageal tissue can be carried into the receiving space, and that the clamping element is displaceable to a clamping position in which oesophageal tissue is clamped between the clamping element and the cylindrical body.

2. The seal as claimed in claim 1, wherein the peripheral wall is provided with at least two openings distributed over the periphery of the peripheral wall.

3. The seal as claimed in claim 2, wherein the sum of the greatest length of the openings in peripheral direction of the peripheral wall covers more than 50% of the periphery of the peripheral wall, and preferably more than 75% of the periphery of the peripheral wall.

4. The seal as claimed in claim 1, wherein the end wall is at least partially conical.

5. The seal as claimed in claim 1, wherein the cylindrical body comprises first fixation means for fixing the clamping element in a transport position relative to the cylindrical body.

6. The seal as claimed in claim 5, wherein the first and second fixation means are adapted to fix the clamping element by means of form-locking.

7. The seal as claimed in claim 5, wherein the first and/or second fixation means comprise at least one recess arranged in the peripheral wall for receiving a protrusion of the clamping element.

8. The seal as claimed in claim 1, wherein the cylindrical body comprises second fixation means for fixing the clamping element in a clamping position relative to the cylindrical body.

9. The seal as claimed in claim 1, wherein the cylindrical body comprises coupling means for coupling the cylindrical body to a carrier for the purpose of positioning the cylindrical body through a part of the oesophagus to a desired location in the oesophagus.

10. The seal as claimed in claim 1, wherein the clamping element is annular and provided on an edge thereof with at least one protrusion for clamping oesophageal tissue between at least a part of the protrusion and the cylindrical body.

11. The seal as claimed in claim 10, wherein the at least one protrusion is formed by lips distributed over the periphery of the clamping element.

12. The seal as claimed in claim 1, wherein the outer diameter of the cylindrical body lies between 30 and 55 mm.

13. The seal as claimed in claim 1, wherein the cylindrical body and/or the clamping element is manufactured substantially from a material selected from the group consisting of: a plastic, a biologically degradable material and an edible material.

14. The seal as claimed in claim 1, wherein the cylindrical body and the clamping element are provided with mutually engaging means defining each other's relative rotation position.

15. A device for placing and fixing a seal in the oesophagus of a slaughtered animal, such as a cow, wherein the device comprises:
    a carrier placed at a first end of an elongate element for positioning a seal through a part of the oesophagus and at a desired location in the oesophagus;
    first urging means controllable from the second end of the elongate element for urging oesophageal tissue through an opening of a cylindrical part of the seal into the interior of the cylindrical part; and
    second urging means controllable from the second end of the elongate element for urging a clamping element of the seal to a clamping position relative to the cylindrical part, wherein oesophageal tissue present in the interior of the cylindrical part is clamped fixedly in the clamping position.

16. The device as claimed in claim 15, wherein the elongate element is at least partially arcuate.

17. The device as claimed in claim 15, wherein the first urging means comprise vacuum means for creating an underpressure in the interior of a cylindrical body placed in the oesophagus, whereby oesophageal tissue is urged through openings arranged in the cylindrical body into the interior of the body.

18. The device as claimed in claim 17, wherein the vacuum means comprise a channel which can be connected to a vacuum pump, extends through the elongate element and debouches at the first carrier.

19. The device as claimed in claim 15, wherein when operated, the second urging means can be moved for the purpose of moving the clamping element in axial direction at least partially into the interior of the cylindrical body.

20. The device as claimed in claim 15, wherein the device comprises a protective sleeve displaceable relative to the carrier, which protective sleeve is displaceable between a position closing openings located in the peripheral wall and a position opening openings located in the peripheral wall.

21. A method for sealing the oesophagus of a slaughtered animal, such as a cow, by arranging a seal, comprising of:
    placing a cylindrical part of a seal, provided with a cylindrical peripheral wall and provided with a closing end wall on one end side, at a desired location in the oesophagus of the animal; and
    displacing a clamping element of the seal relative to the cylindrical part to a clamping position, wherein oesophageal tissue is clamped fixedly between the clamping element and the cylindrical part,
    wherein oesophageal tissue is urged through at least one opening located in the peripheral wall into the interior of the cylindrical part, and that the thus displaced tissue is clamped fixedly between the clamping element moved to a clamping position and the cylindrical part.

22. The method as claimed in claim 21, wherein oesophageal tissue is urged into the interior of the cylindrical part by applying an underpressure in the interior of the cylindrical part.

23. The method as claimed in claim 21, wherein the cylindrical part and the clamping element are carried through the mouth of the animal to the desired location in the oesophagus.

24. The method as claimed in claim 21, wherein the clamping element is moved inside the interior of the cylindrical part to the clamping position.

\* \* \* \* \*